Nov. 6, 1951     A. D. GALE     2,573,789
REAR WINDSHIELD
Filed Nov. 30, 1948     2 SHEETS—SHEET 1
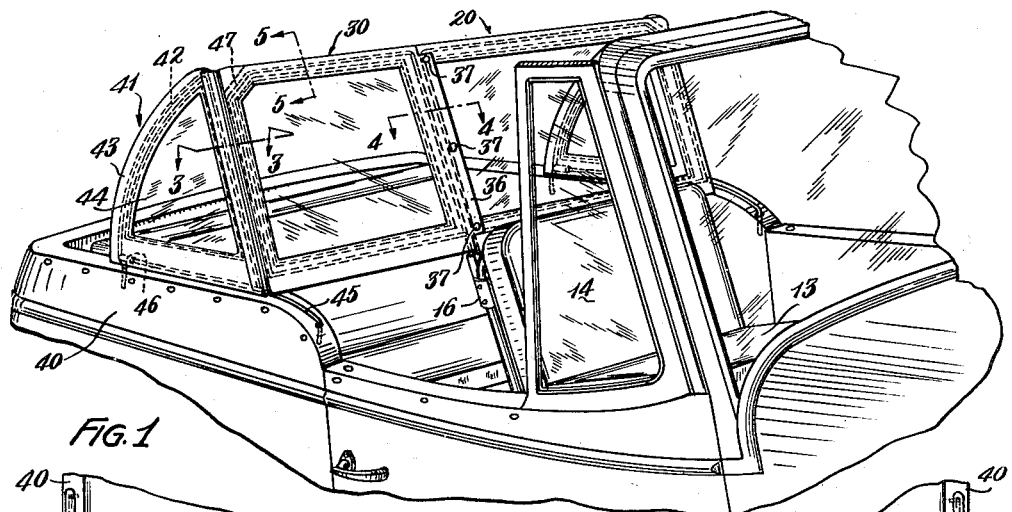
INVENTOR.
A. DAVIS GALE
BY Hudson, Boughton,
Williams, David & Hoffmann.
ATTORNEYS Nov. 6, 1951    A. D. GALE    2,573,789
REAR WINDSHIELD
Filed Nov. 30, 1948    2 SHEETS—SHEET 2

INVENTOR
A. DAVIS GALE
BY Hudson, Boughton,
Williams, David & Hoffmann
ATTORNEYS Patented Nov. 6, 1951

2,573,789

UNITED STATES PATENT OFFICE 2,573,789

REAR WINDSHIELD

Alvan Davis Gale, Beachwood Village, Ohio

Application November 30, 1948, Serial No. 62,764

7 Claims. (Cl. 296—85)

This invention relates to improvements in rear windshields, that is to say windshields for use behind the front seat of a two door convertible automobile body, to promote the comfort of passengers in the rear seat.

One of the objects of the invention is the provision of a windshield divided into two panels one of which is adapted to swing out of the way when a passenger desires to enter or leave the rear compartment through the space afforded by the swinging forward of one section of the front seat of the car.

Another object is the provision of such a construction in demountable units, including side wings or panels for the better deflection of air currents away from occupants of the rear seat.

A further object is the provision of novel means for mounting the two windshield panels upon the fixed section of the front seat, and for supporting the free edge of the swingable panel.

Still another object is the provision of means for effectively closing the joints between the demountable panels.

Other objects and features of novelty will appear as I proceed with the description of that embodiment of the invention which, for the purposes of the present application, I have illustrated in the accompanying drawings, in which Fig. 1 is a perspective view of an automobile body provided with my improved windshield construction, the movable section of the front seat being hinged forward to permit the entrance or exit of a passenger to or from the rear seat of the car.

Fig. 2 is a modified plan view taken at right angles to the plane of the seat back of the front seat and showing the movable seat section in operative position.

Figs. 3 and 4 are detail sectional views taken substantially on the lines 3—3 and 4—4 of Fig. 1.

Fig. 5 is a fragmental view partly in section on the line 5—5 of Fig. 1.

Fig. 10 is a view similar to Fig. 9 but showing a modified form.

Figure 6:
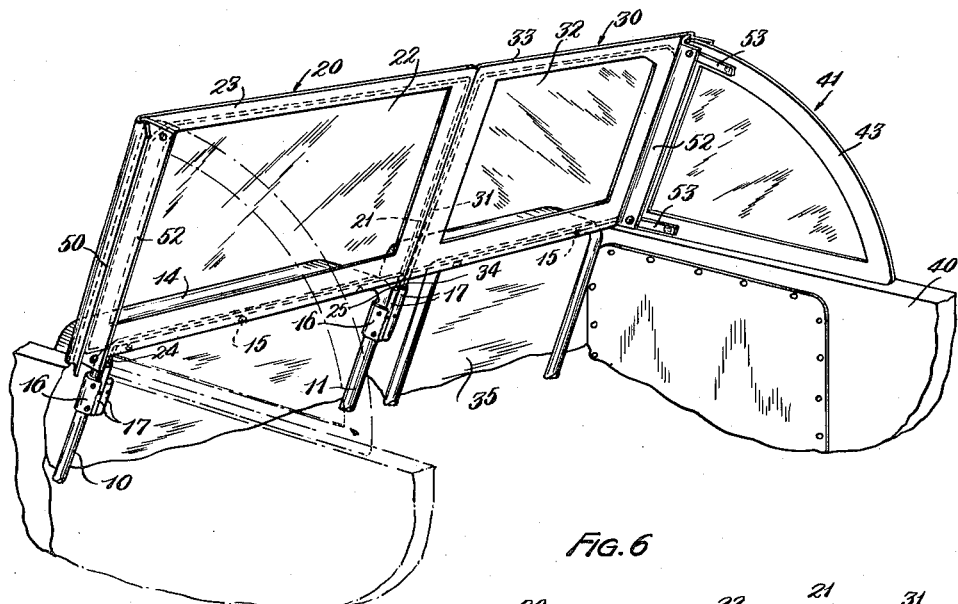
Fig. 6 is a perspective view looking forward from the rear at the windshield panels and one of the side panels or wings.

The two-door convertible automobile body illustrated herein is of a well-known type in which the front seat is divided into two sections, one of which is relatively fixed and the other of which is foldable forward so as to provide space for entrance through the door on that side of the car to the rear seat compartment. The folding top of the car is not illustrated herein, as it forms no part of the present invention.

In the illustrated case the relatively fixed section of the front seat comprises a metal frame having spaced rear legs 10 and 11 connected at the top by an integral cross member 12. The lower portion of the frame, not illustrated, supports the seat cushion 13. The back cushion 14 is attached to the frame members 10, 11 and 12 by screws 15 or their equivalent.

Figures 7, 8:
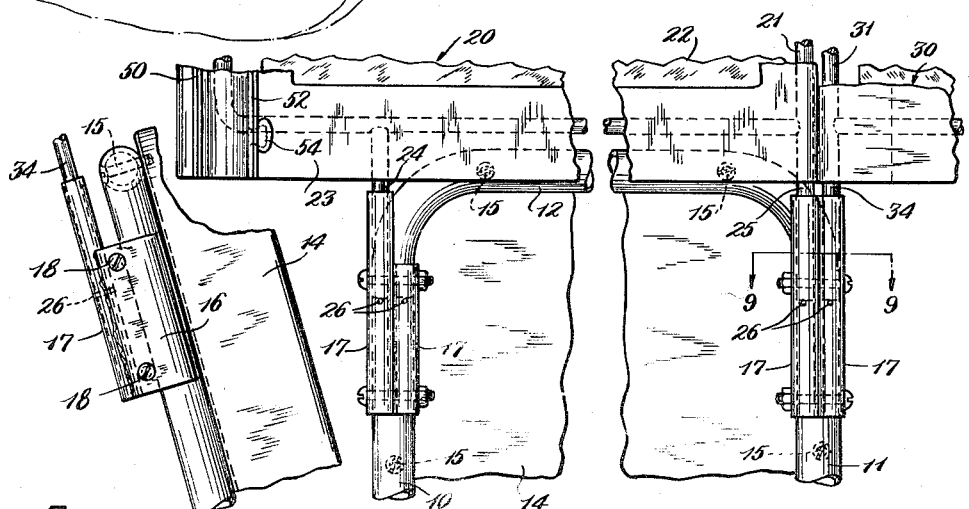
Fig. 7 is a fragmental rear elevational view of the windshield on a larger scale.
Fig. 8 is a fragmental elevational view at right angles to that of Fig. 7.
Figure 9:
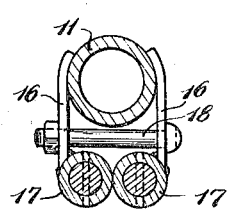
Fig. 9 is a horizontal sectional view taken substantially on the line 9—9 of Fig. 7.

On the legs 11 and 12 just beneath the curved corners of the seat frame, I mount the brackets which support the windshield panels. Each of these brackets comprises two clamping members 16 shaped to partially embrace the leg 10 or 11, as the case may be. To each of the members 16 there is welded a tube 17 which projects upwardly beyond the clamping member 16. These tubes abut and bear against each other when the clamp is set by means of bolts 18 passing through holes in the clamping members 16. Obviously each clamp member 16 and the corresponding tube 17 may be made integral if desired. One of the tubes 17 of the bracket attached to leg 10 may be made short as indicated in Fig. 7, since it functions only in the clamping of the bracket.

The windshield panel which is disposed behind the fixed section of the front seat is designated generally as 20. It comprises a metal frame marked 21, a transparent sheet 22 of celluloid or equivalent material, and a fabric border 23 which envelopes the frame parts and is sewed to the transparent sheet. The frame has two downwardly directed posts 24 and 25, so dimensioned and spaced apart that they may enter tubes 17 in the respective brackets on the frame legs 10 and 11. The depth to which they may enter the tubes is determined by small pins 26 mounted in the tubes.

The other windshield panel is designated generally by the numeral 30. It too comprises a metal frame 31, a transparent sheet 32 and a fabric border 33 enclosing the frame and sewed to the transparent sheet. In this case however the frame has a single downwardly extending post 34 which enters the remaining tube 17 of the bracket on frame leg 11. Its diameter is such as to permit it to turn readily in the tube. When the movable panel 30 is in its operative position illustrated in Figs 1, 2 and 6, it stands directly behind the back 35 of the movable seat section. This panel may be swung on the pivot connection formed by the post 34 and its cooperating tubular socket 17 from the operative position shown in full lines in Fig. 2 through the intermediate position shown in broken lines in that figure over to a position parallel with and in front of fixed panel 20. However it is not ordinarily necessary to swing it beyond this intermediate position. In order to close the joint between the two panels an edge flap 36 is formed of the border fabric on one of them, panel 30 in the illustrated case, and is caused to overlap the adjacent edge of the other panel, being removably secured thereto by snaps 37 of conventional form.

On each of the side walls 40 of the body frame I mount a wing or wall panel, generally designated 41. These panels are constituted similarly to the windshield panels, that is to say they have a metal frame 42 enclosed within fabric border material 43 to which is sewed a transparent sheet 44. The forward edge of each of these panels is inclined parallel to the plane of the windshield panels in their operative position. The bottom element of the frame 42 may extend forward as indicated at 45, and have a downturned end which takes into a socket in the wall 40. The rear end of this element is received in a short tubular part 46 from which a post extends downwardly into another socket in the wall 40. The slidable joint between the tubular part 46 and the frame element 45 accommodates any variation in length of the frame or spacing of the two sockets. When the panel 30 is swung back to operative position the upstanding element of its frame 31 overlaps slightly the inclined forward element of the frame 42 of the side panel, and is thus supported by the latter against rearward movement beyond its intended operative position.

The frame 31 at the upper outer corner of the panel 30, instead of being formed with a 90° angle, has a diagonal element 47 which leaves the extreme corner of the panel entirely flexible, so that when the automobile top is up the panel 30 may be swung forward on its inclined axis without the corner of the rigid frame of the panel interfering with the car top.

The outer edge portions of the two panels 20 and 30 have outer flaps 50 pinch-sewed at 51 to take the position illustrated, whereby air is deflected away from the joint between each windshield panel and the corresponding wall panel 41. A flap 52 is also connected to the fabric border at the outer edge of each of the two panels 20 and 30, which may be snap fastened to the side panel interiorly. Flap 52 may be fastened directly to the fabric border at the front edge of the corresponding wall panel 41, but preferably and as indicated in Figs. 3, 5 and 6 it is snap fastened to one or more straps 53 sewed at their rear ends to the border fabric 43 of the side panels 41. This arrangement provides considerable freedom of movement as between the side panels and the windshield panels, and may be arranged to accommodate slight movements of adjustment of the front seat of the car. It also facilitates the fastening of the snaps 54 from the inside of the car, because it enables the operator to get his fingers under the strap 53 in which the male member of the fastener is mounted.

In Fig. 10 I have illustrated a modification in which the angularly disposed exterior flap 50 is omitted and an exterior flap 55 is substituted for the interior flap 52, being secured to the border fabric of the side panel by snaps 56 or the like.

It will be apparent that the side wall panels 41 and the windshield panels 20 and 30 are readily dismounted after the flap 36 and the two flaps 52 have been unsnapped. These four panels may then be stored, the top may be raised and the regular side curtains enclosing the car completely may be put in place. The windshield panels however do not interfere in any way with the operation of the top, and the latter may be raised to protect the occupants of the car in the event that a storm comes up suddenly.

Having thus described my invention, I claim:

1. In a rear windshield construction for a motor car the front seat of which comprises a non-tilting section and a forwardly tiltable section, a windshield panel carried by said non-tilting section extending upwardly therefrom, a second windshield panel carried by said non-tilting seat section extending upwardly behind said tiltable seat section when the latter is in normal operative position, said second panel being mounted to swing upon an axis adjacent an edge of the first named panel, and means for supporting the free edge of said swingable panel in its operative position.

2. In a rear windshield construction for a motor car the front seat of which comprises a non-tilting section and a forwardly tiltable section, a windshield panel carried by said non-tilting section extending upwardly therefrom, a second windshield panel carried by said non-tilting seat section extending upwardly behind said tiltable seat section when the latter is in normal operative position, both of said panels having metal frames and fabric borders, said second panel being mounted to swing upon an axis parallel to and adjacent an edge of the first named panel, one of said panels having an edge flap overlapping the adjacent edge of the other panel and releasably snapped thereto, and means for supporting the free edge of said swingable panel in its operative position.

3. In a rear windshield construction for a motor car the front seat of which comprises a non-tilting section and a forwardly tiltable section, and in which a frame having vertical side legs constitutes a part of said non-tilting section, brackets mounted on the legs of said frame, a windshield panel mounted in said brackets extending upwardly from said non-tilting seat section, a second windshield panel mounted to swing in the bracket adjacent said tiltable seat section, means for supporting the free edge of said swingable windshield panel in its operative position, and flexible means for bridging the space between said panels.

4. In a rear windshield construction for a motor car the front seat of which comprises a non-tilting section and a forwardly tiltable section and in which a frame having vertical side legs constitutes a part of said non-tilting section, a bracket clamped to each of said side legs, the bracket on the inner one of said side legs having two upstanding sockets side by side, a windshield panel having fabric borders and a metal frame with downwardly extending side members mounted in one of the sockets of each of said brackets, a second windshield panel having fabric borders and a metal frame one side member of which projects downwardly from the panel for reception in a socket of the bracket on the inner leg of said frame and for rotation in said socket, means for connecting the adjacent portions of the fabric borders of said panels above said sockets, and means for supporting the free edge of said swingable panel in its operative position.

5. In a rear windshield construction for a motor car the front seat of which comprises a non-tilting section and a forwardly tiltable section, a windshield panel carried by said non-tilting section extending upwardly therefrom, a second windshield panel carried by said non-tilting seat section extending upwardly behind said tiltable seat section when the latter is in normal operative position, said second panel being mounted to swing upon an axis adjacent an edge of the first named panel, a curtain panel projecting upwardly from the side of the car body to the rear of the front seat thereof, said curtain panel having a metal frame and fabric borders, the forward edge of said side curtain panel supporting the free edge of the swingable windshield panel in its operative position, and an air deflecting flap on the free edge of said swingable panel disposed to engage the front edge of the said side curtain panel exteriorly.

6. In a rear windshield construction for a motor car the front seat of which comprises a non-tilting section and a forwardly tiltable section, a windshield panel carried by said non-tilting section extending upwardly therefrom, a second windshield panel carried by said non-tilting seat section extending upwardly behind said tiltable seat section when the latter is in normal operative position, said second panel being mounted to swing upon an axis adjacent an edge of the first named panel, a curtain panel projecting upwardly from the side of the car body to the rear of the front seat thereof, said curtain panel having a metal frame and fabric borders, the forward edge of said side curtain panel supporting the free edge of the swingable windshield panel in its operative position, and flexible means attached to said swingable panel adapted to be snapped to the forward edge of said side curtain panel.

7. In a rear windshield construction for a motor car the front seat of which comprises a non-tilting section and a forwardly tiltable section, a windshield panel carried by said non-tilting section extending upwardly therefrom, a second windshield panel carried by said non-tilting seat section extending upwardly behind said tiltable seat section when the latter is in normal operative position, said second panel being mounted to swing upon an axis adjacent an edge of the first named panel, a curtain panel projecting upwardly from the side of the car body to the rear of the front seat thereon, said curtain panel having a metal frame and fabric borders, the forward edge of said side curtain panel supporting the free edge of the swingable windshield panel in its operative position, an air deflecting flap on the free edge of said swingable panel disposed to engage the front edge of the said side curtain panel exteriorly, and flexible means attached to said swingable panel adapted to be snapped to the forward edge of said side curtain panel interiorly.

ALVAN DAVIS GALE.

REFERENCES CITED

The following references are of record in the file of this patent:

UNITED STATES PATENTS

| Number | Name | Date |
| --- | --- | --- |
| 1,203,587 | Cring | Nov. 7, 1916 |
| 1,481,548 | Gongaware | Jan. 22, 1924 |